United States Patent
Kirkpatrick et al.

(10) Patent No.: US 8,978,843 B2
(45) Date of Patent: Mar. 17, 2015

(54) BRAKE DISK ASSEMBLY

(71) Applicant: Goodrich Corporation, Charlotte, NC (US)

(72) Inventors: Christopher T. Kirkpatrick, Pueblo West, CO (US); Robert Fiala, Spokane, WA (US)

(73) Assignee: Goodrich Corporation, Charlotte, NC (US)

( * ) Notice: Subject to any disclaimer, the term of this patent is extended or adjusted under 35 U.S.C. 154(b) by 41 days.

(21) Appl. No.: 13/726,752

(22) Filed: Dec. 26, 2012

(65) Prior Publication Data

US 2014/0174863 A1   Jun. 26, 2014

(51) Int. Cl.
| | |
|---|---|
| F16D 65/12 | (2006.01) |
| B60T 1/06 | (2006.01) |
| F16D 55/36 | (2006.01) |
| F16D 65/00 | (2006.01) |
| F16D 55/00 | (2006.01) |
| F16D 65/02 | (2006.01) |

(52) U.S. Cl.
CPC ............. B60T 1/065 (2013.01); F16D 65/12 (2013.01); F16D 55/36 (2013.01); F16D 65/0006 (2013.01); *F16D 2055/0058* (2013.01); *F16D 2065/132* (2013.01); *F16D 2065/1328* (2013.01)
USPC ................................ 188/218 XL; 188/71.5

(58) Field of Classification Search
USPC .......................................... 188/71.5, 218 XL
See application file for complete search history.

(56) References Cited

U.S. PATENT DOCUMENTS

| | | | |
|---|---|---|---|
| 2,675,106 A | 4/1954 | Foster | |
| 3,498,418 A * | 3/1970 | Dewar | 188/71.5 |
| 3,548,979 A * | 12/1970 | Dernovshek et al. | 188/264 CC |
| 4,465,165 A | 8/1984 | Bok | |
| 4,585,096 A | 4/1986 | Bok | |
| 4,804,071 A | 2/1989 | Schultz et al. | |
| 4,844,206 A | 7/1989 | Casey | |
| 4,878,563 A | 11/1989 | Baden et al. | |
| 5,143,184 A | 9/1992 | Snyder et al. | |
| 5,299,667 A | 4/1994 | Hammond | |
| 5,779,006 A | 7/1998 | Hyde et al. | |
| 6,340,075 B1 | 1/2002 | Bok et al. | |
| 6,352,147 B1 | 3/2002 | Orlamunder et al. | |
| 6,702,068 B1 | 3/2004 | Riebe | |
| 7,303,055 B2 | 12/2007 | Eckert et al. | |
| 7,500,546 B2 | 3/2009 | Thorp | |
| 2010/0000070 A1 * | 1/2010 | La Forest et al. | 29/525.06 |

FOREIGN PATENT DOCUMENTS

GB          2444927 A        6/2008

OTHER PUBLICATIONS

Extended European Search Report, dated Apr. 3, 2014, for European Application No. 13198202.7, 6 pages.

* cited by examiner

*Primary Examiner* — Christopher Schwartz
(74) *Attorney, Agent, or Firm* — Kinney & Lange, P.A.

(57) ABSTRACT

An annular-shaped disk half of a split friction disk assembly for a disk brake system. The disk half includes a friction surface and a non-friction surface. The friction surface is at an axial end of the disk half. The non-friction surface is at an axial end of the disk half on a side opposite of the friction surface. The non-friction surface includes a contact surface and a non-contact surface. The non-contact surface is recessed from the contact surface.

18 Claims, 6 Drawing Sheets

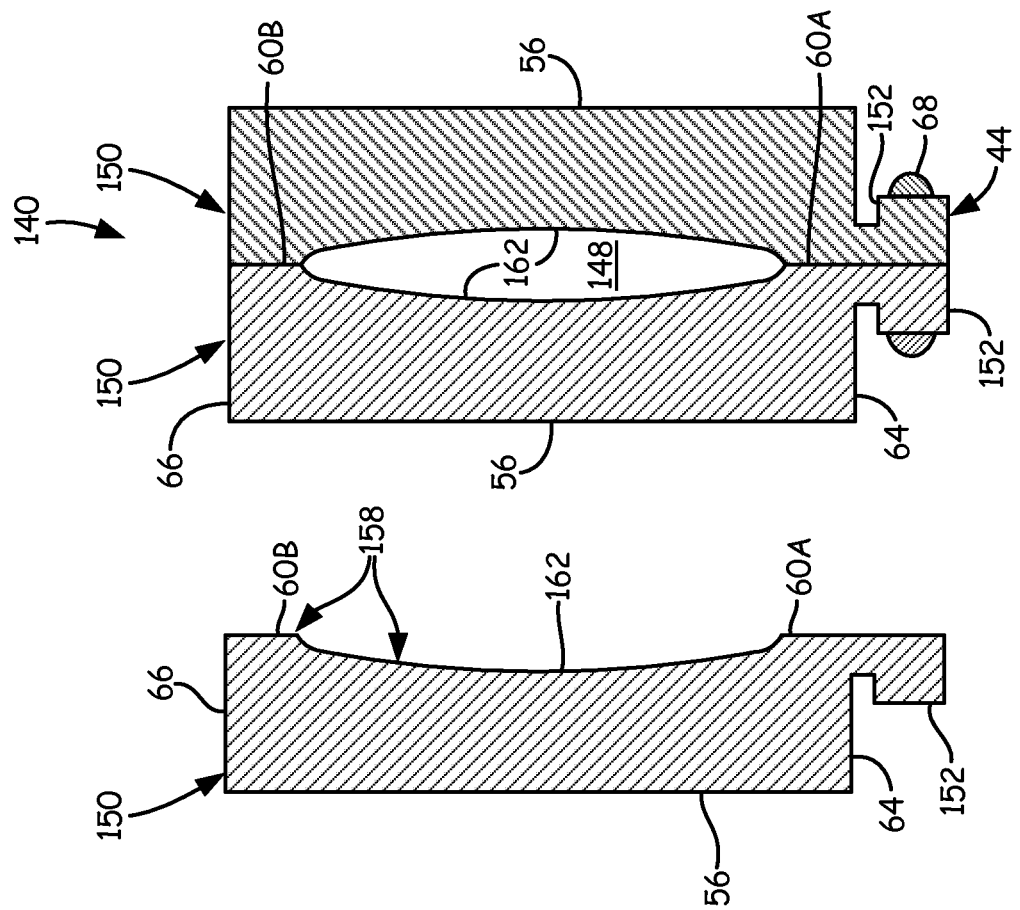
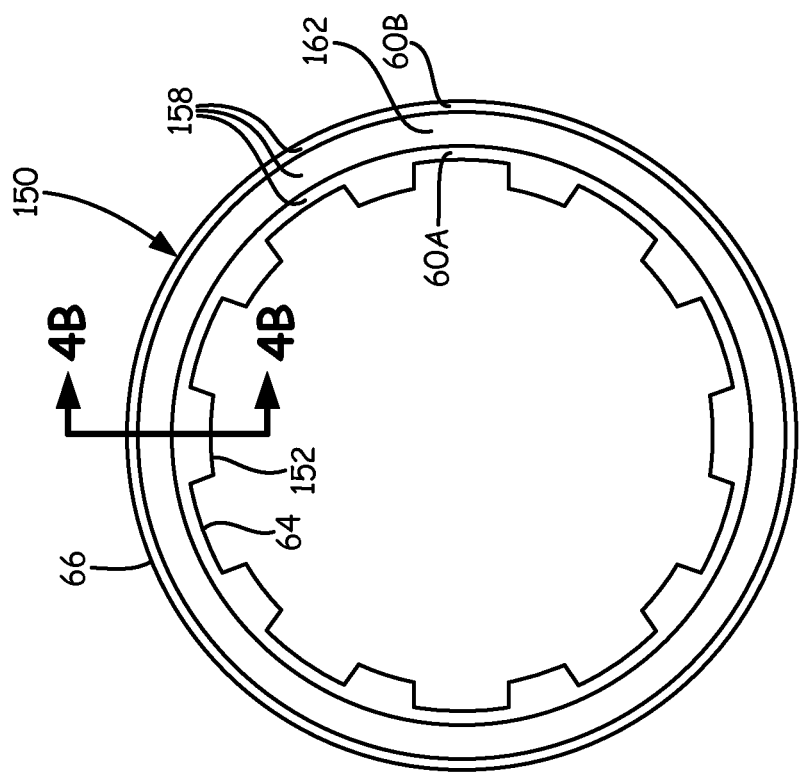

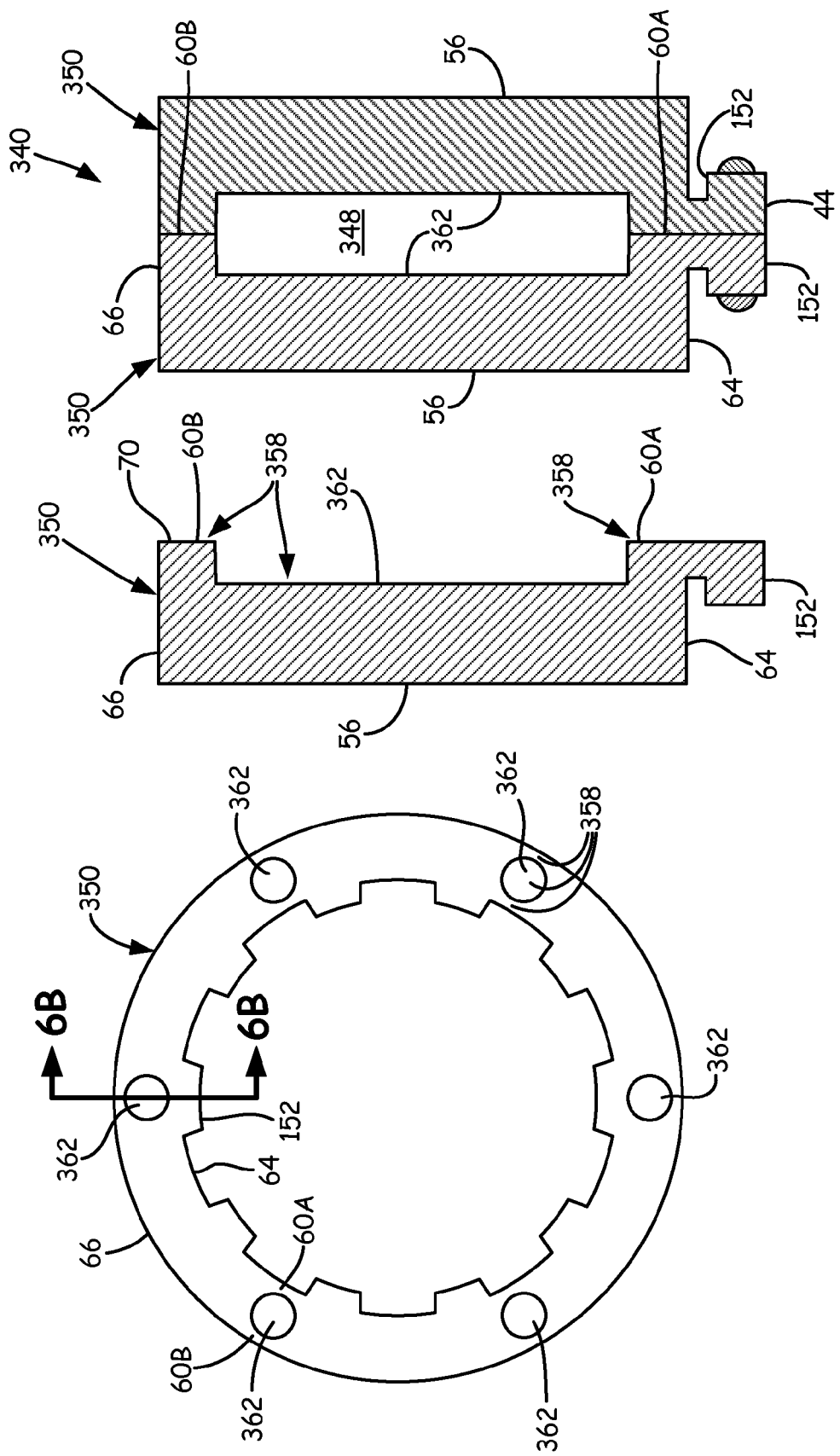

BRAKE DISK ASSEMBLY

BACKGROUND

The present invention relates to aircraft braking systems. In particular, the invention relates to a brake disk assembly of an aircraft braking system.

Aircraft brake systems typically employ a series of friction disks forced into contact with each other to stop the aircraft. Friction disks splined to a non-rotating wheel axle are interspersed with friction disks splined to the rotating wheel. The friction disks must withstand and dissipate the heat generated from contact between the friction disks during braking. During high speed landings and rejected takeoffs, the amount of heat generated can be enough to destroy friction disks made of formerly commonly used materials, such as steel. Carbon composite materials are better suited for high temperature use and are now the standard for friction disks in aircraft brake assemblies. However, carbon composite disks suffer from a tendency to vibrate in use, and generate significant brake noise. Thus, it is desirable to employ carbon composite disks that suffer less vibration and generate less brake noise.

SUMMARY

An embodiment of the present invention is an annular-shaped disk half of a split friction disk assembly for a disk brake system. The disk half includes a friction surface and a non-friction surface. The friction surface is at an axial end of the disk half. The non-friction surface is at an axial end of the disk half on a side opposite of the friction surface. The non-friction surface includes a contact surface and a non-contact surface. The non-contact surface is recessed from the contact surface.

Another embodiment of the present invention is a split friction disk assembly for a disk brake system. The split friction disk includes two disk halves. Each of the two disk halves includes a friction surface and a non-friction surface. The friction surface is at an axial end of the disk half. The non-friction surface is at an axial end of the disk half on a side opposite of the friction surface. The non-friction surface includes a contact surface and a non-contact surface. The contact surface is for contacting a non-friction surface of the other disk half. The non-contact surface is recessed from the contact surface. The two disk halves are in direct physical contact with each other at their respective contact surfaces. The two disk halves create a cavity between their respective non-contact surfaces.

BRIEF DESCRIPTION OF THE DRAWINGS

FIGS. 4A-4C are an axial side view and cross-sectional views of another split friction disk half and disk assembly embodying the present invention.

FIGS. 6A-6C are an axial side view and cross-sectional views of another split friction disk half and disk assembly embodying the present invention.

DETAILED DESCRIPTION

Embodiments of the present invention include a split friction disk for a disk brake system that includes two disk halves. Each of the two disk halves includes a circumferentially extending recess on an axial side of the disk opposite a friction side. The two disk halves are assembled into a split friction disk such that their recesses face each other, forming a cavity. Non-friction surfaces where the disk halves contact each other are in physical contact, but do not form a continuous structure. This structural discontinuity at the contact surfaces serves to damp vibration. In addition, the cavity limits the area of contact between the halves, which also greatly damps vibration.

Heat generated during braking is not uniformly radially distributed across the friction surface. The greatest build up of heat from braking occurs midway between the inner and outer diameters of the friction disk, at the mid-diameter. As a result, the friction disk tends to expand more at the mid-diameter, resulting in a bowing of the friction surface. Bowing of the friction surface necessarily reduces the contact area between friction disks, reducing braking performance under certain conditions, and generally increasing the variability in braking performance. Embodiments of the present invention show much less tendency to bow at mid-diameter because the cavity provides an expansion region for brake material. Thus, in addition to reducing brake vibration and brake noise, embodiments of the present invention also provide for improved braking performance under certain conditions, and for decreased variability in braking performance.

Figure 1:
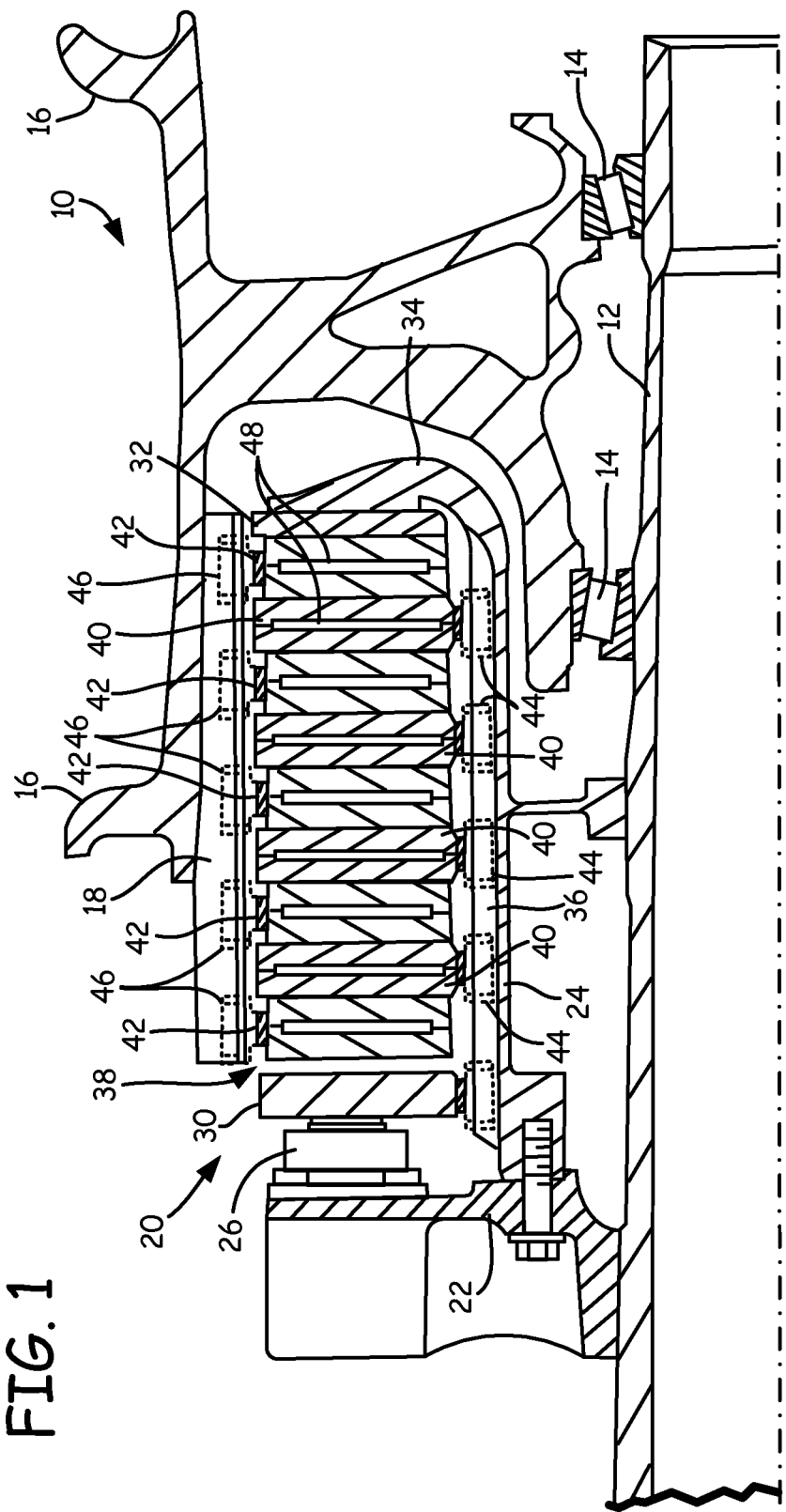
FIG. 1 is a partial cross-sectional view of brake assembly embodying the invention.

FIG. 1 shows wheel 10 supported for rotation around axle 12 by bearings 14. Wheel 10 includes rims 16 for supporting a tire (not shown), and a series of axially extending rotor splines 18 (one shown). Rotation of wheel 10 is modulated by disk brake system 20. Disk brake system 20 includes torque flange 22, torque tube 24, a plurality of pistons 26 (one shown), pressure carbon disk 30, and end plate 32. Torque tube 24 is an elongated annular structure that includes reaction plate 34, and a series of axially extending stator splines 36 (one shown). Reaction plate 34 and stator splines 36 may be integral with torque tube 24 as shown in FIG. 1, or attached as separate components.

Disk brake system 20 also includes a plurality of split friction disks 38. The plurality of split friction disks 38 includes at least one non-rotatable friction disk 40, and at least one rotatable friction disk 42. Each split friction disk 38 includes an attachment structure. In the embodiment of FIG. 1, each of four non-rotatable friction disks 40 include a plurality of lugs 44 at circumferentially spaced positions around non-rotatable friction disk 40 as an attachment structure. Similarly, each of five rotatable friction disks 42 include a plurality of lugs 46 at circumferentially spaced positions around rotatable friction disk 42 as an attachment structure. Each split friction disk 38 also includes cavity 48 as described below in reference to FIGS. 2A-2C. In the embodiment of FIG. 1, pressure carbon disk 30, end plate 32, and split friction disks 38 are all annular structures made of a carbon composite material.

Torque flange 22 is mounted to axle 12. Torque tube 24 is bolted to torque flange 22 such that reaction plate 34 is near an axial center of wheel 12. End plate 32 is connected to a surface of reaction plate 34 facing axially away from the axial center of wheel 12. Thus, end plate 32 is non-rotatable by virtue of its connection to torque tube 24. Stator splines 36 support pressure carbon disk 30 so that pressure carbon disk 30 is also non-rotatable. Stator splines 36 also support non-rotatable friction disks 40. Non-rotatable friction disks 40 engage stator splines 36 with gaps formed between lugs 44. Similarly, rotatable friction disks 42 engage rotor splines 18 with gaps formed between lugs 46. Thus, rotatable friction disks 42 are rotatable by virtue of their engagement with rotor splines 18 of wheel 12.

As shown in FIG. 1, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 12 and contact a side of pressure carbon disk 30 opposite rotatable friction disks 42. Pistons 26 may be powered electrically, hydraulically, or pneumatically.

Figure 2:
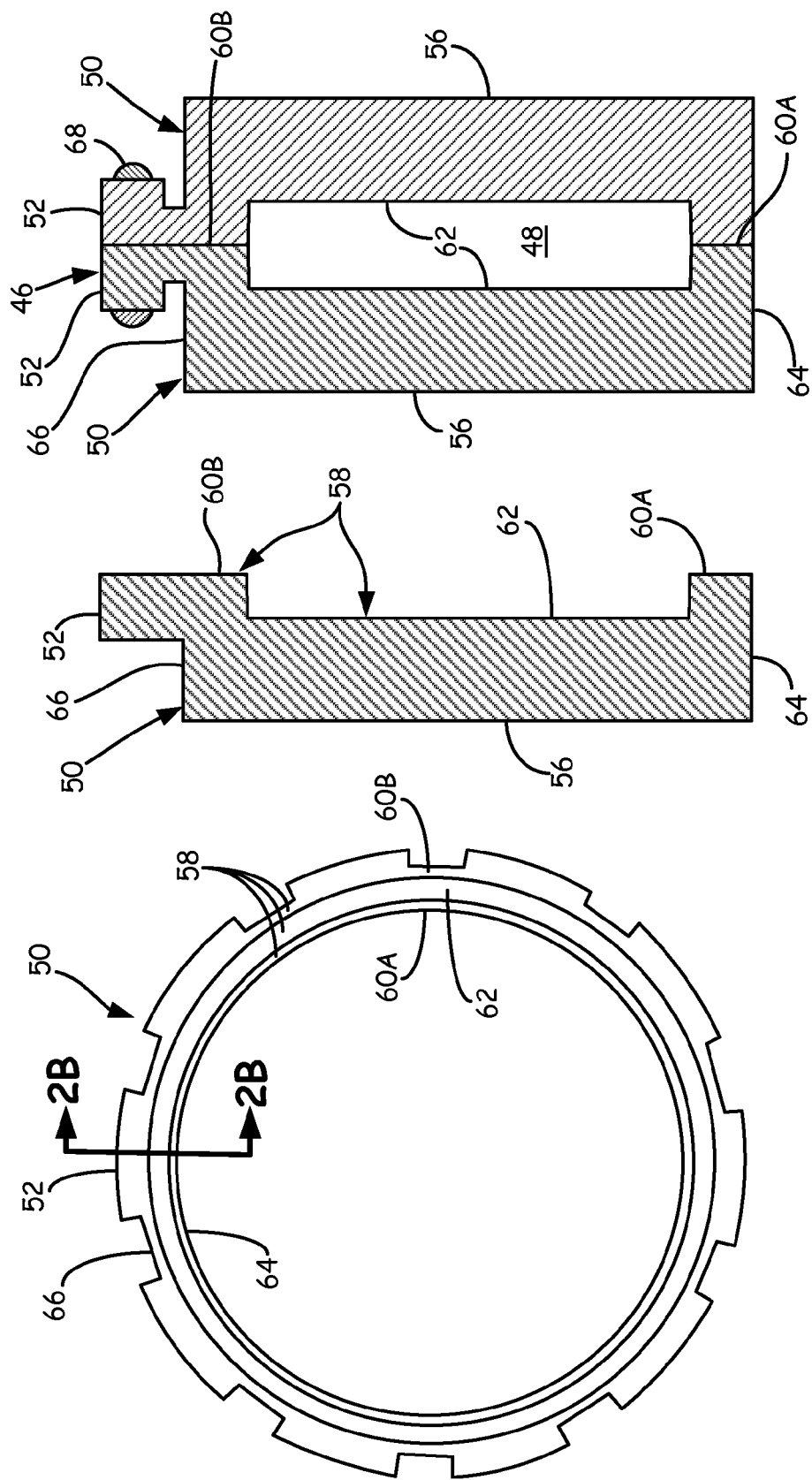
FIGS. 2A-2C are an axial side view and cross-sectional views of a split friction disk half and disk assembly embodying the present invention.

FIGS. 2A-2C are an axial side view and cross-sectional views of a split friction disk half and disk assembly embodying the present invention. FIGS. 2A-2C illustrate an example of split friction disk 38, rotatable friction disk 42. FIG. 2A shows an axial side view of disk half 50 of rotatable friction disk 42. FIG. 2B shows a cross-sectional view of disk half 50. FIG. 2C shows a cross-sectional view of rotatable friction disk 42. Considering FIGS. 2A-2C together, rotatable friction disk 42 includes two disk halves 50. Each disk half 50 includes an attachment structure in the form of lug 52, friction surface 56, and non-friction surface 58. Friction surface 56 is at an axial end of disk half 50. Friction surface 56 is for operationally engaging a corresponding friction surface of another disk brake system component, such as non-rotatable friction disk 40. Non-friction surface 58 is at an axial end of disk half 50 on a side opposite of friction surface 56. Non-friction surface 58 includes contact surface 60A, 60B and non-contact surface 62. Non-contact surface 62 is recessed from contact surface 60A, 60B and, in this embodiment contact surface 60A, 60B is parallel to non-contact surface 62. Contact surface 60A, 60B is for contacting a non-friction surface of another disk brake system component, another disk half 50.

Disk half 50 further includes inner diameter surface 64, and outer diameter surface 66. Inner diameter surface 64 is at a radially inward facing edge of disk half 50. Outer diameter surface 66 is at a radially outward facing edge of disk half 50. Friction surface 56 and non-friction surface 58 extend radially between inner diameter surface 64 and outer diameter surface 66. Contact surface 60A, 60B is parallel to friction surface 56 and includes inner diameter portion 60A and outer diameter portion 60B. Inner diameter portion 60A is radially between non-contact surface 62 and inner diameter surface 64. Outer diameter portion 60B is radially between non-contact surface 62 and outer diameter surface 66. Non-contact surface 62 is radially between inner diameter surface 64 and outer diameter surface 66. Non-contact surface 62 extends circumferentially around at least a portion of disk half 50. As shown best in FIG. 2A, non-contact surface 62 extends circumferentially around the entirety of disk half 50 to form a complete annulus.

Each disk half 50 includes an attachment structure in the form of lug half 52. Lug half 52 projects radially outward from outer diameter surface 66. As best shown in FIG. 2C, disk halves 50 are assembled such that their respective contact surfaces 60A, 60B are in physical contact to form rotatable friction disk 42. Disk halves 50 are secured to each other by a fastening device. In this embodiment, the fastening device is rivet 68. Once assembled, rotatable friction disk 42 includes cavity 48 formed by the recessed non-contact surfaces 62 of the two disk halves 50. Importantly, while the corresponding contact surfaces 60A, 60B of the two disk halves 50 are held in physical contact, they do not form a continuous structure. That is, the corresponding contact surfaces 60A, 60B are not bonded to each other in any way, but merely held together.

Although the embodiment of FIGS. 2A-2C is described in terms of rotatable friction disk 42, it is understood that the same description and features apply generally to either type of split friction disk 38 and thus, to non-rotatable friction disk 40, except that lug 46 at outer diameter surface 66 is replaced by lug 44 at inner diameter surface 64.

Considering FIGS. 1, and 2A-2C together, prior to operation of disk brake system 20, pistons 26 are not actuated and gaps exist between each of rotatable friction disks 42 and each of the non-rotatable friction components: pressure carbon disk 30, end plate 32, and non-rotatable friction disks 40. The gaps are formed by the axial spreading out of the rotatable friction disks 42 along rotor splines 18; and the non-rotatable friction disks 40, and pressure carbon disk 30 along stator splines 36 due to the movement of rotatable friction disks 42 adjacent to the non-rotatable friction components. During operation of disk brake system 20, pistons 26 are actuated, forcing pressure carbon disk 30 to move along stator splines 36 against the plurality of split friction disks 38, forcing them axially toward end plate 32 and reaction plate 34. Squeezed between pressure carbon disk 30 and reaction plate 34, the gaps are eliminated as friction surfaces contact other friction surfaces. Drag generated by the contact of the friction surfaces acts to slow rotatable friction disks 42 and wheel 12. The drag also generates significant heat which is absorbed by split friction disks 38.

Brake vibration is significantly damped by split friction disks 38. Split friction disks 38 are assembled from two disk halves 50 such that their corresponding respective contact surfaces 60 are in physical contact, but do not form a continuous structure. Thus, vibration is damped at contact surfaces 60, even though brake pressure is satisfactorily transmitted to and from all split friction disks 38. In addition, cavity 48 limits the area of contact surfaces 60, which also greatly damps vibration.

Figure 3:
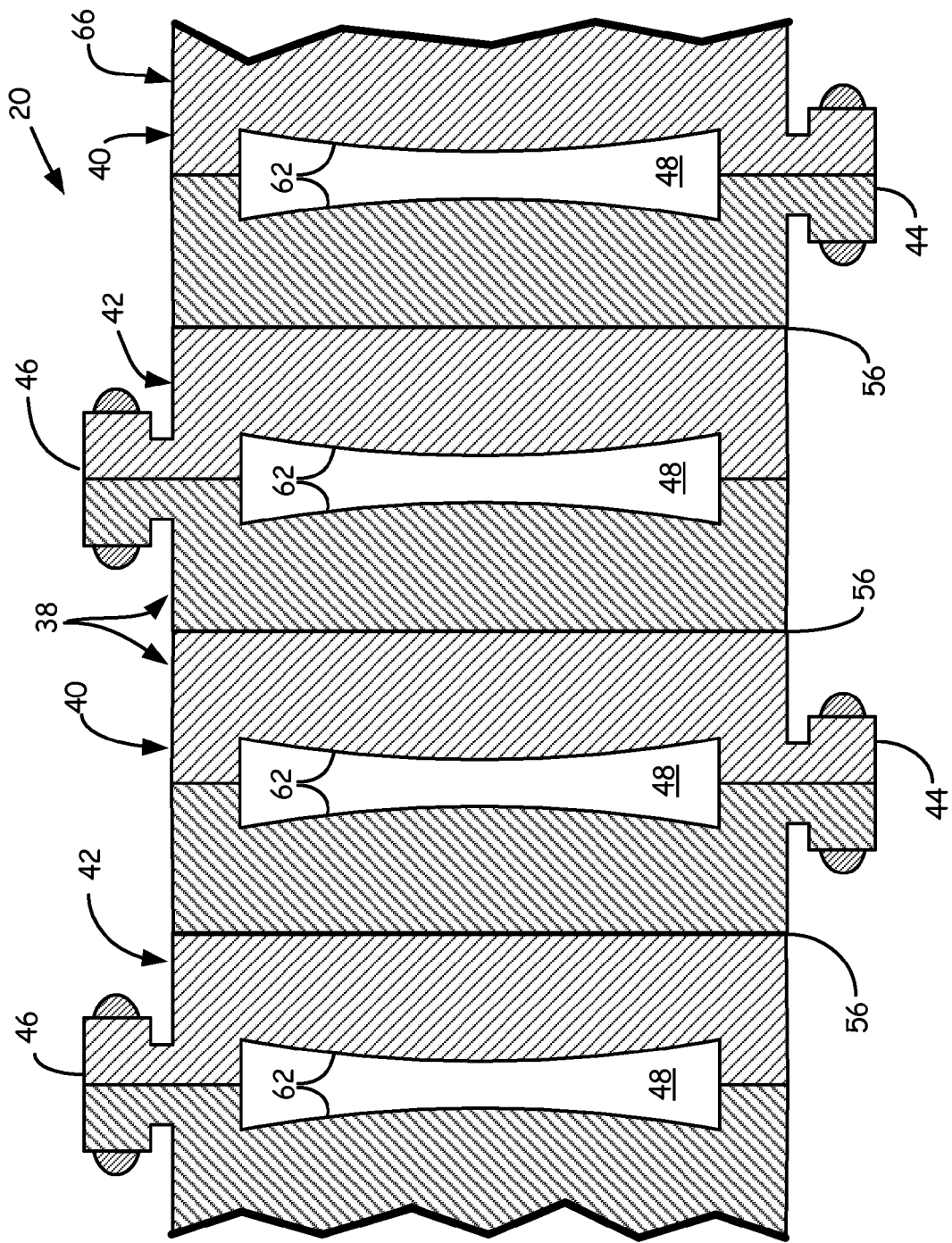
FIG. 3 is an exaggerated enlarged partial cross-section view of a portion of the brake assembly of FIG. 1.

FIG. 3 is an exaggerated enlarged partial cross-section view of a portion of the brake assembly of FIG. 1. FIG. 3 shows four split friction disks 38: two non-rotatable friction disks 40 interleaved with two rotatable friction disks 42. FIG. 3 illustrates the effect of cavity 48 during braking that generates a great deal of heat. As heat is generated at friction surfaces 56 by drag from the relative motion of rotatable friction disks 42 and non-rotatable friction disks 40, the heat is absorbed by the carbon composite material of split friction disks 38. The greatest build up of heat from braking occurs midway between inner diameter surface 64 and outer diameter surface 66 at a mid-diameter, expanding split friction disks 38 to a greater extent at the mid-diameter. The mid-diameter of split friction disk 38 expands into cavity 48, temporarily decreasing the width of cavity 48. Bowing of friction surfaces 56 against each other is significantly reduced as compared to the same case without cavity 48. The reduction in bowing improves braking performance and significantly reduces variability in braking performance.

FIGS. 4A-4C are an axial side view and cross-sectional views of another split friction disk half and disk assembly embodying the present invention. The embodiment of FIG. 4A-4C is identical to that of FIGS. 2A-2C except that non-friction surface 158 of disk half 150 includes non-contact surface 162, instead of non-contact surface 62. In addition, although the embodiment of FIGS. 4A-4C is shown and described in terms of non-rotatable friction disk 140, it is understood that the same description and features apply generally to either type of split friction disk 38 and thus, to a corresponding rotatable friction disk, except that lug 44 at inner diameter surface 64 is replaced by lug 46 at outer diameter surface 66.

In the embodiment of FIGS. 4A-4C, non-contact surface 162 is contoured so that it is recessed from contact surface 60A, 60B to a greatest extent midway between inner diameter portion 60A and outer diameter portion 60B. Non-contact surface 162 is recessed from contact surface 60A, 60B to a lesser extent nearer each of inner diameter portion 60A and outer diameter portion 60B. As best shown in FIG. 4C, disk halves 150 are assembled such that their corresponding contact surfaces 60A, 60B are in physical contact to form non-rotatable friction disk 140. Once assembled, rotatable friction disk 140 includes cavity 148 formed by the recessed non-contact surfaces 162 of the two disk halves 150. The embodiment of FIGS. 4A-4C includes all of the advantages of the previous embodiment. In addition, the contoured non-contact surface 162 may provide additional durability in some applications.

Figure 5C:
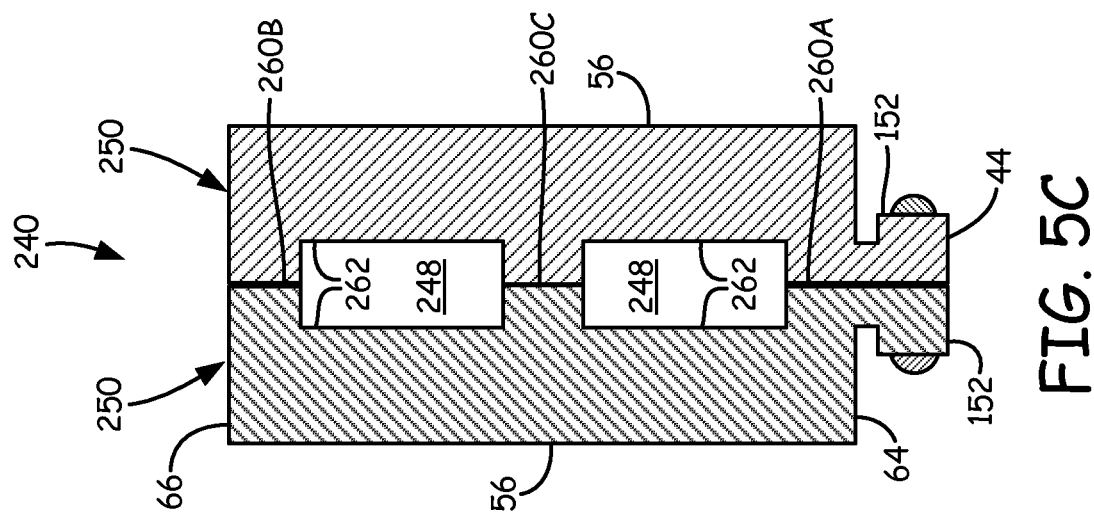
FIGS. 5A-5C are an axial side view and cross-sectional views of another split friction disk half and disk assembly embodying the present invention.
Figure 5B:
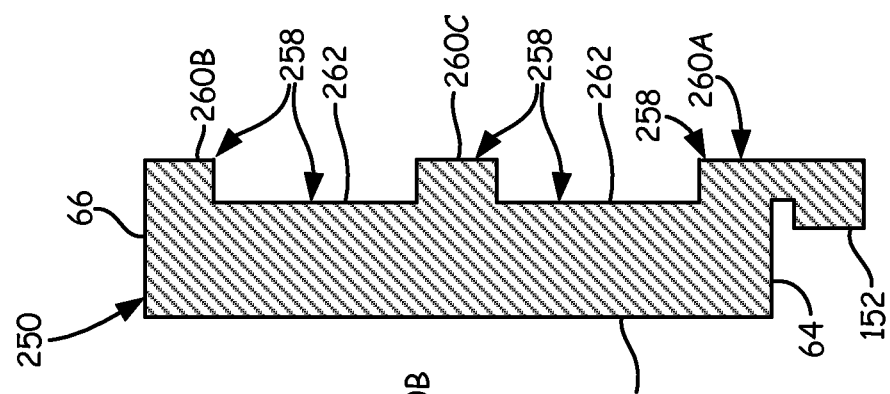
Figure 5A:
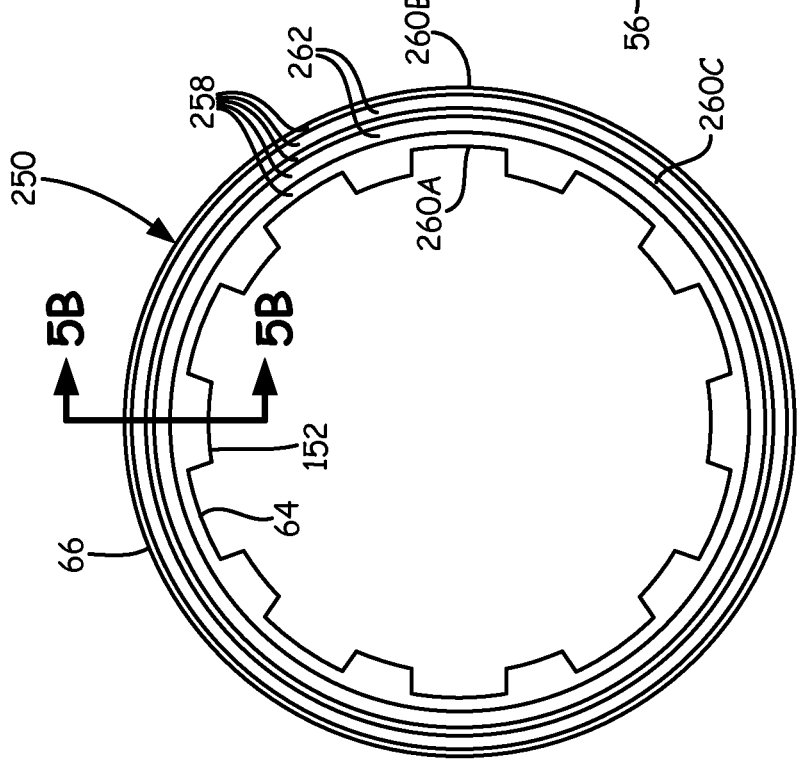

FIGS. 5A-5C are an axial side view and cross-sectional views of another split friction disk half and disk assembly embodying the present invention. The embodiment of FIG. 5A-5C is identical to that of FIGS. 2A-2C except that non-friction surface 258 of disk half 250 includes non-contact surface 262 instead of non-contact surface 62, and contact surface 260A, 260B, 260C instead of contact surface 60A, 60B. In addition, although the embodiment of FIGS. 5A-5C is shown and described in terms of non-rotatable friction disk 240, it is understood that the same description and features apply generally to either type of split friction disk 38 and thus, to a corresponding rotatable friction disk, except that lug 44 at inner diameter surface 64 is replaced by lug 46 at outer diameter surface 66.

In the embodiment of FIGS. 5A-5C, contact surface 260A, 260B, 260C is parallel to friction surface 56 and includes inner diameter portion 260A, outer diameter portion 260B, and mid-diameter portion 260C. Inner diameter portion 260A is radially between non-contact surface 262 and inner diameter surface 64. Outer diameter portion 260B is radially between non-contact surface 62 and outer diameter surface 66. Mid-diameter portion 260C is disposed midway between inner diameter surface 64 and outer diameter surface 66, radially dividing non-contact surface 262 along its full circumferential extent. Disk halves 250 are assembled such that their corresponding contact surfaces 260A, 260B, 260C are in physical contact to form non-rotatable friction disk 240. Once assembled, non-rotatable friction disk 240 includes cavity 248 formed by the recessed non-contact surfaces 262. The embodiment of FIGS. 5A-5C provides the advantages of the embodiment described above in reference to FIGS. 2A-2C, but provides a mechanism for controlling the extent of braking performance improvement. This is important for some aircraft braking systems where a fixed level of braking performance is required.

FIGS. 6A-6C are an axial side view and cross-sectional views of another split friction disk half and disk assembly embodying the present invention. The embodiment of FIG. 6A-6C is identical to that of FIGS. 2A-2C except that non-friction surface 358 of disk half 350 includes non-contact surface 362 instead of non-contact surface 62, and lug 46 at outer diameter surface 66 is replaced by lug 44 at inner diameter surface 64. Unlike all embodiments described above, aspects of this embodiment limit its application to non-rotatable types of split friction disk 38.

In the embodiment of FIGS. 6A-6C, non-contact surface 362 extends circumferentially around at least a portion of disk half 350 in the form of a plurality of surfaces spaced circumferentially around disk half 350. As best shown in FIG. 6A, in this embodiment, non-contact surface 362 is a plurality of circular-shaped surfaces. As best shown in FIG. 6C, disk halves 350 are assembled such that their corresponding contact surfaces 60A, 60B are in physical contact to form non-rotatable friction disk 340. Once assembled, non-rotatable friction disk 340 includes cavity 348 formed by the contoured and recessed non-contact surfaces 362 of the two disk halves 350. Considering FIGS. 1 and 6A, each of the plurality of circular-shaped surfaces of non-contact surface 362 are disposed around disk half 350 so that once non-rotatable friction disk 340 is installed in disk brake system 20, each of the circular-shaped surfaces of non-contact surface 362 aligns with one of pistons 26. The embodiment of FIGS. 6A-6C provides the advantages of the embodiment described above in reference to FIGS. 2A-2C, but increases the durability of non-rotatable friction disk 340 by limiting cavity 348 to piston 26 regions where the compliance provided by cavity 348 is most beneficial.

Throughout this application, figures are generally not to scale and some features are exaggerated for the purposes of illustration. For example, cavity 48 shown in FIG. 1 has an axial width of less than 0.100 inches (2.54 mm). In some embodiments, the width of cavity 48 is at least 0.010 inches (0.25 mm) and no more than 0.030 inches (0.76 mm). In some embodiments, inner diameter portion 60A and outer diameter portion 60B of contact surface 60A, 60B have radial widths of no more than 1.0 inches (25.4 mm) and no less than 0.12 inches (3.0 mm). In some embodiments, outer diameter surface 66 has a diameter of no greater than 21 inches (533 mm) and no less than 10 inches (254 mm). In some embodiments, non-contact surface 62 has a radial width of no less than 1.5 inches (38.1 mm) and no more than 3.0 inches (76.2 mm).

A split friction disk for a disk brake system embodying the present invention includes an internal cavity formed by recesses in each of the two disk halves that form the split friction disk. The internal cavity provides vibration damping by limiting the contact area between the disk halves and providing a discontinuity at the contact area. The internal cavity also provides a space to accommodate thermal expansion of each disk half during braking. By accommodating thermal expansion in this way, friction surfaces show much less tendency to bow at mid-diameter because the cavity provides an expansion region for brake material. Reduced bowing of split friction disks provides for improved and more consistent braking performance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

An annular-shaped disk half of a split friction disk assembly for a disk brake system includes a friction surface and a non-friction surface. The friction surface is at an axial end of the disk half. The non-friction surface is at an axial end of the disk half opposite of the friction surface. The non-friction surface includes a contact surface and a non-contact surface. The non-contact surface is recessed from the contact surface.

The disk half of the preceding paragraph can optionally include, additionally and/or alternatively, any one or more of the following features, configurations and/or additional components:

the non-contact surface is parallel to the contact surface;

the disk half further includes an inner diameter surface at a radially inward facing edge of the disk half; and an outer diameter surface at a radially outward facing edge of the disk half; wherein the friction surface and non-friction surface extend radially between the inner diameter surface and the outer diameter surface; the friction surface for operationally engaging a corresponding friction surface of another disk brake system component; and the contact surface for contacting a non-friction surface of another disk brake system component;

the contact surface includes an inner diameter portion radially between the non-contact surface and the inner diameter surface; and an outer diameter portion radially between the non-contact surface and the outer diameter surface; and the non-contact surface extends circumferentially around at least a portion of the disk half;

the non-contact surface is radially between the inner diameter surface and the outer diameter surface, and extends circumferentially around the entire disk half to form a complete annulus;

the contact surface further includes a mid-diameter portion disposed midway between the inner diameter surface and the outer diameter surface, the mid-diameter portion radially dividing the non-contact surface;

the non-contact surface includes a contour wherein the non-contact surface is recessed from the contact surface to a greatest extent midway between the inner diameter portion and the outer diameter portion, and the non-contact surface is recessed from the contact surface to a lesser extent nearer each of the inner diameter portion and the outer diameter portion;

the disk half further includes at least one attachment structure projecting radially outward from the outer diameter surface for contacting a wheel;

the disk half further includes at least one attachment structure projecting radially inward from the inner diameter surface for contacting a torque tube;

the non-contact surface includes a plurality of surfaces spaced circumferentially around at least a portion of the disk half; and the non-contact surface includes a plurality of circular-shaped surfaces spaced circumferentially around the disk half.

A split friction disk assembly for a disk brake system includes two disk halves. Each of the two disk halves includes a friction surface and a non-friction surface. The friction surface is at an axial end of the disk half. The non-friction surface is at an axial end of the disk half opposite of the friction surface. The non-friction surface includes a contact surface and a non-contact surface. The contact surface is for contacting a contact surface of the other disk half. The non-contact surface is recessed from the contact surface. The two disk halves are in direct physical contact with each other at their respective contact surfaces to create a cavity between their respective non-contact surfaces.

The split friction disk assembly of the preceding paragraph can optionally include, additionally and/or alternatively, any one or more of the following features, configurations and/or additional components:

each of the two disk halves further includes an inner diameter surface at a radially inward facing edge of the disk half; and an outer diameter surface at a radially outward facing edge of the disk half; wherein the friction surface and non-friction surface extend radially between the inner diameter surface and the outer diameter surface; the friction surface for operationally engaging a corresponding friction surface of another disk brake system component;

the contact surface includes an inner diameter portion radially between the non-contact surface and the inner diameter surface; and an outer diameter portion radially between the non-contact surface and the outer diameter surface; and the non-contact surface extends circumferentially around at least a portion of the disk half;

the non-contact surface is radially between the inner diameter surface and the outer diameter surface, and extends circumferentially around the entire disk half to form a complete annulus;

the contact surface further includes a mid-diameter portion disposed midway between the inner diameter surface and the outer diameter surface, the mid-diameter portion radially dividing the non-contact surface;

the assembly further includes at least one attachment structure projecting radially outward from the outer diameter surface of each of the two disk halves for contacting a wheel; the two disk halves aligned such that their respective attachment structures are aligned to each other; the two disk halves held together at the attachment structures by at least one fastening device;

the assembly further includes at least one attachment structure projecting radially inward from the inner diameter surface of each of the two disk halves for contacting a torque tube; the two disk halves aligned such that their respective attachment structures are aligned to each other; the two disk halves held together at the attachment structures by at least one fastening device; and the attachment structures are lugs, and the fastening device is at least one of a rivet and a bolt.

The invention claimed is:

1. An annular-shaped disk half of a split friction disk assembly for a disk brake system comprising:
    a friction surface at an axial end of the disk half; and
    a non-friction surface at an axial end of the disk half on a side opposite of the friction surface, the non-friction surface including:
        a contact surface; and
        a non-contact surface recessed from the contact surface;
    an inner diameter surface at a radially inward facing edge of the disk half; and
    an outer diameter surface at a radially outward facing edge of the disk half;
    wherein the friction surface and non-friction surface extend radially between the inner diameter surface and the outer diameter surface; the friction surface for operationally engaging a corresponding friction surface of another disk brake system component; and the contact surface for contacting a non-friction surface of another disk brake system component.

2. The disk half of claim 1, wherein:
    the contact surface includes:
        an inner diameter portion radially between the non-contact surface and the inner diameter surface; and
        an outer diameter portion radially between the non-contact surface and the outer diameter surface; and
    the non-contact surface extends circumferentially around at least a portion of the disk half.

3. The disk half of claim 2, wherein the non-contact surface is radially between the inner diameter surface and the outer diameter surface, and extends circumferentially around the entire disk half to form a complete annulus.

4. The disk half of claim 2, wherein the contact surface further includes a mid-diameter portion disposed midway between the inner diameter surface and the outer diameter surface, the mid-diameter portion radially dividing the non-contact surface.

5. The disk half of claim 2, wherein the non-contact surface includes a contour wherein the non-contact surface is recessed from the contact surface to a greatest extent midway between the inner diameter portion and the outer diameter portion, and the non-contact surface is recessed from the contact surface to a lesser extent nearer each of the inner diameter portion and the outer diameter portion.

6. The disk half of claim 1, further including at least one attachment structure projecting radially inward from the inner diameter surface for contacting a torque tube.

7. The disk half of claim 6, wherein the non-contact surface includes a plurality of surfaces spaced circumferentially around at least a portion of the disk half.

8. The disk half of claim 6, wherein the non-contact surface includes a plurality of circular-shaped surfaces spaced circumferentially around the disk half.

9. The disk half of claim 1, wherein the non-contact surface is parallel to the contact surface.

10. The disk half of claim 1, further including at least one attachment structure projecting radially outward from the outer diameter surface for contacting a wheel.

11. A split friction disk assembly for a disk brake system comprising:
    two disk halves, each of the two disk halves including:
        a friction surface at an axial end of the disk half; and
        a non-friction surface at an axial end of the disk half on a side opposite of the friction surface, the non-friction surface including:
            a contact surface for contacting a contact surface of the other disk half;
            a non-contact surface recessed from the contact surface;
            an inner diameter surface at a radially inward facing edge of the disk half; and
            an outer diameter surface at a radially outward facing edge of the disk half;
    wherein the two disk halves are in direct physical contact with each other at their respective contact surfaces to create a cavity between their respective non-contact surfaces; and
    wherein the friction surface and non-friction surface extend radially between the inner diameter surface and the outer diameter surface; the friction surface for operationally engaging a corresponding friction surface of another disk brake system component.

12. The assembly of claim 11, wherein for each of the two disk halves:
    the contact surface includes:
        an inner diameter portion radially between the non-contact surface and the inner diameter surface; and
        an outer diameter portion radially between the non-contact surface and the outer diameter surface; and
    the non-contact surface extends circumferentially around at least a portion of the disk half.

13. The assembly of claim 12, wherein for each of the two disk halves, the non-contact surface is radially between the inner diameter surface and the outer diameter surface, and extends circumferentially around the entire disk half to form a complete annulus.

14. The assembly of claim 12, wherein for each of the two disk halves, the contact surface further includes a mid-diameter portion disposed midway between the inner diameter surface and the outer diameter surface, the mid-diameter portion radially dividing the non-contact surface.

15. The assembly of claim 11, further including at least one attachment structure projecting radially outward from the outer diameter surface of each of the two disk halves for contacting a wheel; the two disk halves aligned such that their respective attachment structures are aligned to each other; the two disk halves held together at the attachment structures by at least one fastening device.

16. The assembly of claim 15, where the attachment structures are lugs, and the fastening device is at least one of a rivet and a bolt.

17. The assembly of claim 11, further including at least one attachment structure projecting radially inward from the inner diameter surface of each of the two disk halves for contacting a torque tube; the two disk halves aligned such that their respective attachment structures are aligned to each other; the two disk halves held together at the attachment structures by at least one fastening device.

18. The assembly of claim 17, where the attachment structures are lugs, and the fastening device is at least one of a rivet and a bolt.

* * * * *